March 19, 1968   G. P. MAURER ETAL   3,373,626
MOUNTING ASSEMBLY FOR SHAFT MOUNTED GEAR DRIVE UNIT
Filed Sept. 22, 1966   4 Sheets-Sheet 1

INVENTORS
GEORGE P. MAURER
ALLYN E. PHILLIPS

BY *Donald J. Lesser*

ATTORNEY

March 19, 1968 G. P. MAURER ETAL 3,373,626
MOUNTING ASSEMBLY FOR SHAFT MOUNTED GEAR DRIVE UNIT
Filed Sept. 22, 1966 4 Sheets-Sheet 2
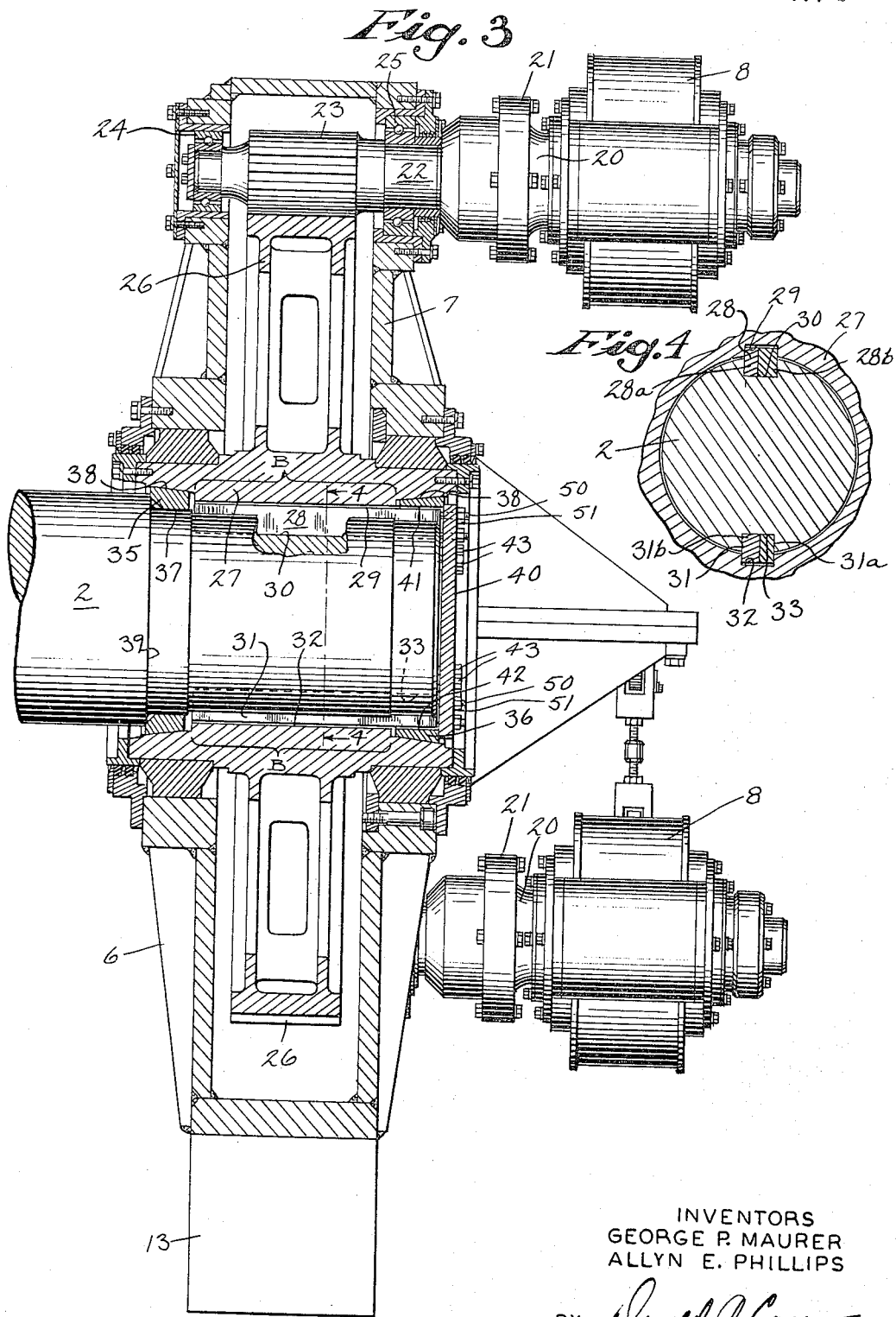
INVENTORS
GEORGE P. MAURER
ALLYN E. PHILLIPS
BY Donald J. Casser
ATTORNEY

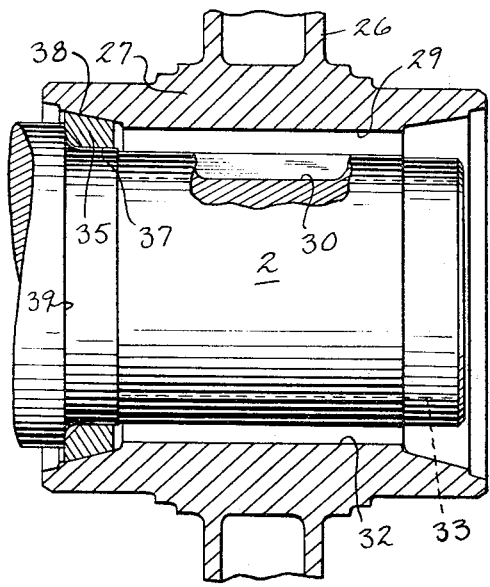
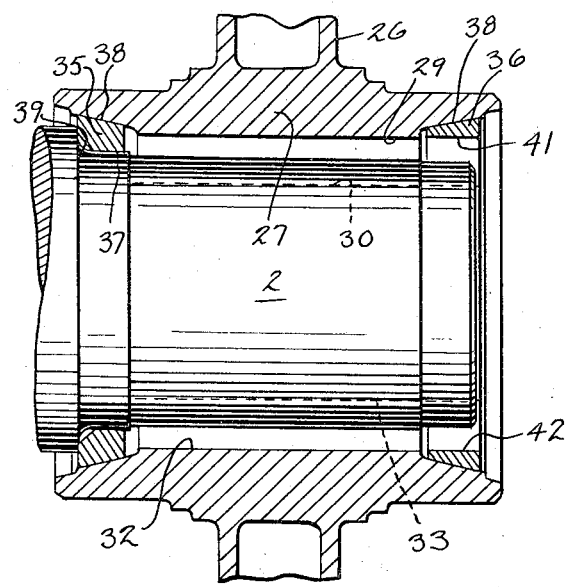
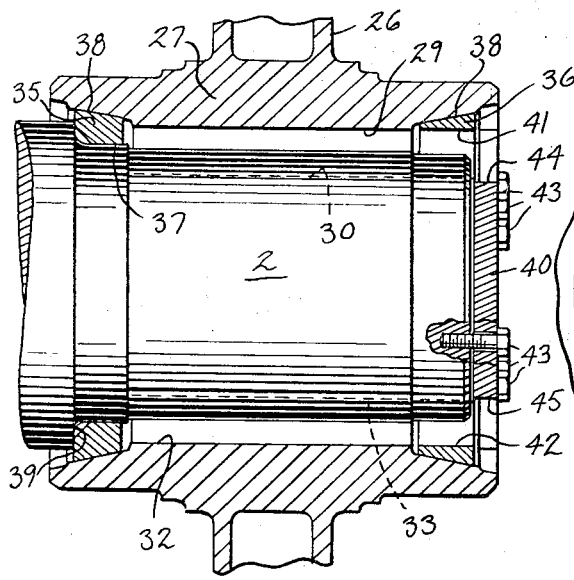
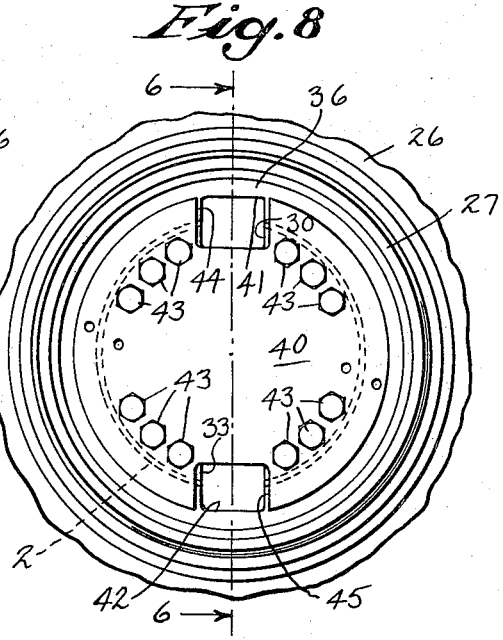
INVENTORS
GEORGE P. MAURER
ALLYN E. PHILLIPS
ATTORNEY

INVENTORS
GEORGE P. MAURER
ALLYN E. PHILLIPS

BY Donald J. Cusser

ATTORNEY

United States Patent Office 3,373,626
Patented Mar. 19, 1968

3,373,626
MOUNTING ASSEMBLY FOR SHAFT MOUNTED GEAR DRIVE UNIT
George P. Maurer, Wauwatosa, and Allyn E. Phillips, Brookfield, Wis., assignors to The Falk Corporation, Milwaukee, Wis., a corporation of Wisconsin
Filed Sept. 22, 1966, Ser. No. 581,280
4 Claims. (Cl. 74—421)

This invention relates to the provision of means for mounting a shaft mounted gear drive on its supporting shaft, and a method for assembling the drive on the shaft.

GENERAL FIELD

Shaft mounted gear drive units include a hollow shaft member for mounting the unit on a driven or driving shaft and for supporting the gearing and housing of the drive. This hollow shaft member can be a separate element or, particularly on large drives, it can be an integral portion of the hub of the final reduction gear in the drive. A typical example of a shaft mounted gear drive unit to which the present invention relates are those commonly used as large industrial heavy duty drives, for example, a drive assembly for turning or tilting a furnace vessel employed in making steel by the oxygen process. For most applications, the shaft mounted gear drive unit is used as a speed reducer and the unit is cantilever-mounted on a driven shaft. Typically, the complete unit will include a final or low speed reduction gear, intermediate speed reducing gears driving the low speed gear from one or more power sources, and a housing in which all or part of the drive units are mounted. In such a unit, clearance must be provided between the bore of the hollow shaft member and the outside diameter of the driven shaft member in order to allow assembly of the unit onto the driven shaft and permit disassembly when that is necessary. Torque is generally transmitted from the hollow shaft member to the supporting shaft by keys engaged in keyways defined in both shafts.

PRIOR ART

Two typical prior art systems for mounting a shaft mounted gear drive are shown in U.S. Patents Nos. 3,151,-502 and 3,207,002. In 3,151,502, a hollow shaft or sleeve is provided that contacts a supporting trunnion shaft throughout its length and on which the other elements of the drive are assembled. 3,207,002 shows a system in which the low speed gear has an elongated hub section that contacts a supporting trunnion shaft throughout its length.

THE PROBLEM

Shaft mounted gear drive mounting arrangements such as the prior art systems mentioned above can present problems.

The problem of fitting and aligning parts during assembly of the drive is quite difficult on large size shaft mounted gear drives. As a consequence, fretting corrosion on the mating contacting surfaces becomes prevalent, more so than is the case with small units. With large surfaces in contact and heavy weights of component parts, extreme difficulty in the removal of the large units in service has been experienced due to the development of fretting corrosion during operation of the drive. On medium and small size shaft mounted gear drives, the problems presented by the clearance fit between shaft elements and the fit and alignment of a key or keys in the keyways are within such limits that the drives generally function satisfactorily for the application involved. Nevertheless, experience has shown that even with the smaller units, fretting corrosion often results on mating contacting surfaces so that the removal of the drive for maintenance or repair becomes difficult.

PRESENT INVENTION

Some principal objects of this invention are: to provide a mounting assembly for a shaft mounted gear drive unit which will minimize fretting corrosion of the type described above; to provide such an assembly that will permit ease of mounting and dismounting of the drive unit on a shaft; and to provide a mounting assembly for a shaft mounted gear drive unit which will insure proper alignment of the hollow shaft member of the unit that is to be mounted upon a shaft driven by the unit or which is to be mounted on the shaft of a prime mover which is to drive the unit. Another main object is to provide a mounting assembly for a shaft mounted gear drive unit in which the hollow shaft member of the unit is mounted upon a cantilevered shaft of driven equipment or of a prime mover and wherein the hollow gear shaft member is supported at its ends upon the cantilever shaft with the intermediate coextensive lengths of the shafts being out of contact with each other so that fretting corrosion is thereby minimized. A more specific object is to provide, in a mounting assembly of the type described, cone-shaped supporting centering rings on which a hollow shaft member of a gear drive unit is mounted on a shaft for only a minor portion of the length of the hollow shaft member in order to reduce fretting corrosion. A still more specific object of this invention is to provide the particular new or improved details of construction or method hereinafter claimed. These and other objects will appear in the description which follows.

Briefly stated, the problems previously mentioned are solved by the present invention by supporting a shaft mounted gear drive unit on a shaft on a pair of spaced rings so that the major portion of the hollow shaft member is out of contact with the shaft. Where the gear drive unit is mounted in cantilever fashion on the shaft, at least one of the rings is formed to enable the insertion of keys to provide the driving connection between the hollow shaft member and the shaft. Further, in the illustrated form of this invention, the surface of each supporting ring which is in contact with the hollow shaft member of the drive unit is tapered and the mating portions of the hollow shaft portions are similarly tapered to provide a tight diametrical fit of the rings. Another structural member may be added to the basic combination, comprising a locking plate which has a first position that enables the insertion of keys between the hollow shaft member and the supporting shaft and a second position that enables it to aid in holding the keys in place.

In the following description, reference is made to the accompanying drawings which form a part hereof and in which there is shown, by way of illustration and not of limitation, a presently-contemplated preferred mode in which this invention may be practiced. This will be discussed in sufficient detail to enable those skilled in the art to comprehend this invention, but it is to be understood that other embodiments of the invention may be used and that structural changes in the embodiment described herein may be made by those skilled in the art without departing from the true scope of the present invention. Like reference numerals refer to the same part throughout the various drawings, in which:

FIG. 3 is a vertical sectional view taken along the plane of line 3—3 of FIG. 1 showing details of the internal construction of the shaft mounted gear drive unit;

FIG. 4 is a sectional view taken along the plane of line 4—4 of FIG. 3; and

FIGS. 5–12 are side and end views of a portion of the gear drive unit as illustrated in FIG. 3 showing sequential steps in the assembly of the drive onto a shaft.

TYPICAL INSTALLATION (FIGS. 1 AND 2)

Figure 1:
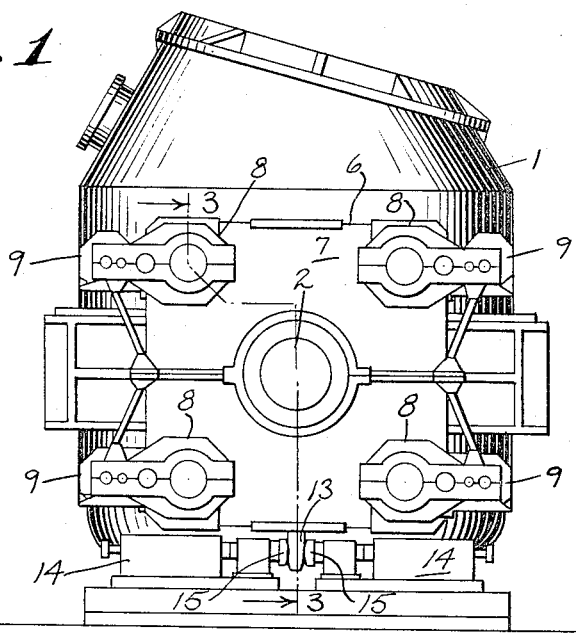
FIGS. 1 and 2 are side and front views respectively of a typical apparatus on which a shaft mounted gear drive unit of a type to which the present invention pertains may be installed.
Figure 2:
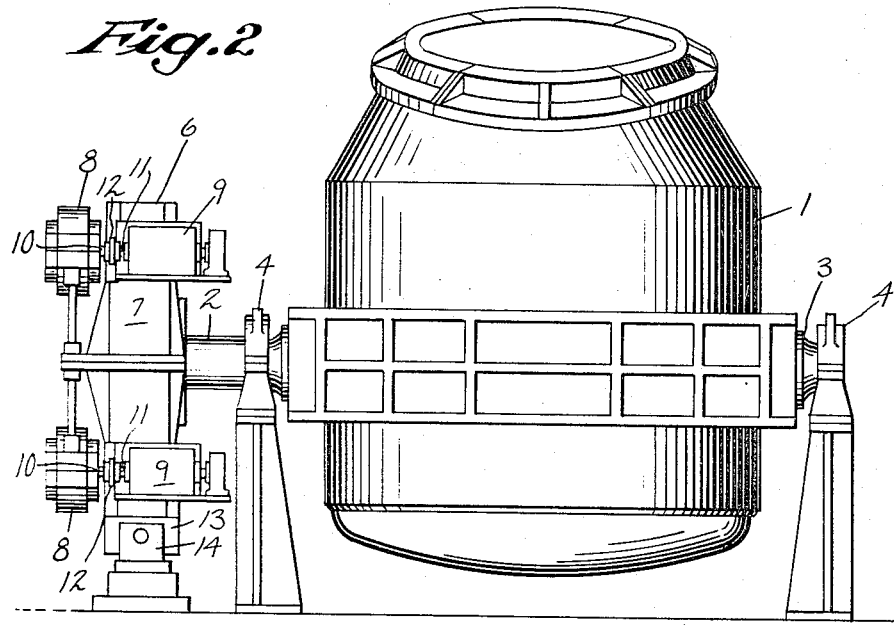

FIGS. 1 and 2 illustrate a typical installation of a shaft mounted gear drive unit comprising a basic oxygen furnace 1 of the type utilized in steel making which has trunnion shafts 2 and 3 projecting from opposite ends that are supported in trunnion pedestals 4. The trunnion shafts 2 and 3 define a horizontal axis about which the furnace 1 can be tilted to permit loading the furnace with raw materials for making steel and pouring molten steel from the furnace upon completion of the operation, the furnace being loaded or unloaded through its top. A typical furnace may weigh several hundred tons and may be on the order of 20–25 feet in diameter and 25–30 feet high. In order to rotate the furnace about the trunnion axis, a gear drive unit 6 is mounted on trunnion shaft 2 and this invention relates to the mechanism or means by which the gear drive is mounted on said shaft.

The shaft mounted gear drive unit 6 includes a housing 7, which may be of the split-type formed of two parts joined together, and four speed reducers 8 driven by motors 9, with the motors and speed reducers mounted on the housing 7. Each speed reducer 8 has an input shaft 10 connected to the output shaft 11 of each motor through a coupling 12 (see FIG. 2). In order to prevent rotation of the housing during operation, a projecting member or plate 13 depends from the bottom of the housing 7, and a pair of torque or shock absorbers 14 having reciprocable pistons 15 are mounted on the foundation so that the ends of the pistons 15 contact opposite sides of the plate 13.

It is stressed that the installation shown in FIGS. 1 and 2 is a typical use of a shaft mounted gear drive unit and that the present invention may be utilized with shaft mounted gear drives incorporated in many other types of apparatus such as crushers, mixers, conveyors, grinding mills, hoists, etc.

DETAILS OF GEAR DRIVE (FIG. 3)

Referring now to the detailed construction of the gear drive 6 as shown in FIG. 3, the first stage of speed reduction is accomplished by the speed reducers 8, whose internal construction is not shown in FIG. 3 but which may include as many stages of speed reduction as desired for the particular installation, each reducer having a hollow output shaft 20 connected to a coupling hub 21 keyed to a low speed pinion shaft 22 that carries a low speed pinion 23. The low speed pinion 23 is shown herein as being formed as an integral portion of the low speed shaft 22, although other constructions may be used. As indicated in the drawing, the low speed shaft 22 is journaled in suitable bearings 24 and 25 carried in opposite walls of the housing 7. The pinion 23 meshes with a low speed gear 26 that is drivingly connected to the trunnion shaft 2 in the manner hereinafter described, the low speed gear 26 also being enclosed in the housing 7. The low speed gear 26 includes an elongated hollow shaft member 27 which is to be drivingly connected to the trunnion shaft; although shown as an integral hub portion of the low speed gear, other constructions are possible and, for example, the hollow shaft member may be a separate shaft section to which the low speed gear is attached.

A keyed driving connection between the hollow shaft member 27 and the trunnion shaft 2 is obtained, at the top of the shaft as shown in FIG. 3, by means of a key means 28 inserted between keyways 29 and 30 formed in the hollow shaft member 27 and trunnion shaft respectively, and, at the bottom of the shaft as shown in FIG. 3, by a key means 31 inserted between keyways 32 and 33 formed in the hollow shaft member 27 and trunnion shaft 2 respectively.

In accordance with this invention, to support the hollow shaft portion 27 on the trunnion shaft 2, a pair of spaced supporting rings 35 and 36 are provided, each having an inner surface 37 that contacts the trunnion shaft and an outer surface 38 that contacts a part of the hollow shaft member 27 (inner surface 37 of the ring 36 not being visible in FIG. 3). The outer surface 38 of each ring is tapered in the manner shown in FIG. 3 and its mating surface of the hollow shaft member is similarly tapered. Except for this contact between the surfaces 37, 38 of the rings 35 and 36, the rest of the hollow shaft member 27 is spaced slightly from the trunnion shaft 2 so that there is no contact therebetween; thus the major intermediate section indicated as B of the shaft 27 is spaced from the trunnion shaft. This space or clearance between the hollow shaft member 27 and trunnion shaft 2 is best indicated in the sectional view of FIG. 4 (which is in a reduced scale as compared to FIG. 3). In this fashion, there is a minimum of surface contact between the trunnion shaft and hollow shaft member and thereby a substantial reduction in the possibility of having fretting corrosion developing between these two surfaces.

For the purpose explained below, the supporting ring 36 has a pair of slots 41 and 42 (see FIG. 6) defined in it which are aligned with keyways 29 and 32 respectively of the hollow shaft 27, the slots being slightly larger than the dimensions of the keyways in the hollow shaft 27. The supporting ring 35 abuts a shoulder 39 formed as a portion of the trunnion shaft 2 and the ring 36 abuts a locking plate 40 which is bolted to the end of the trunnion shaft 2, to thereby hold the rings in axial alignment on the trunnion shaft and secure the drive in its final position.

ASSEMBLY (FIGS. 5–12)

Turning now to the sequential views of FIGS. 5–12, the manner of assembling the drive 6 on the shaft 2 will be described. Starting with FIG. 5, the tapered supporting ring 35 is fit on the trunnion shaft 2 until it abuts the shoulder 39. The shaft mounted gear drive 6 is then mounted on the trunnion shaft 2 and the keyways 29 and 32 of the hollow shaft member 27 are lined up as closely as possible with their respective mating keyways 30 and 33 defined in the trunnion shaft 2.

Referring now to FIG. 6, the tapered supporting ring 36 is fit into place next, with its slots 41 and 42 lined up with the keyways 29 and 32, respectively, of the hollow shaft member 27. When in this position, the slots 41 and 42 form a continuous passage with their respective mating keyways of the hollow shaft 27.

The next step is shown in FIG. 7, in which the locking plate 40 is attached by bolts 43 to the end of the trunnion shaft 2, with the bolts being only slightly tightened at this stage. As best seen in FIG. 8, the locking plate 40 also has a pair of diametrically opposed slots 44 and 45, and when the plate 40 is placed as in FIGS. 7 and 8, it is positioned in such fashion that its slots 44 and 45 are in line with the slots 41 and 42 respectively of the supporting ring 36, and slots 44 and 45 are wide and deep enough to allow free access to the keyways 30 and 33 of the trunnion shaft 2.

Figure 9:
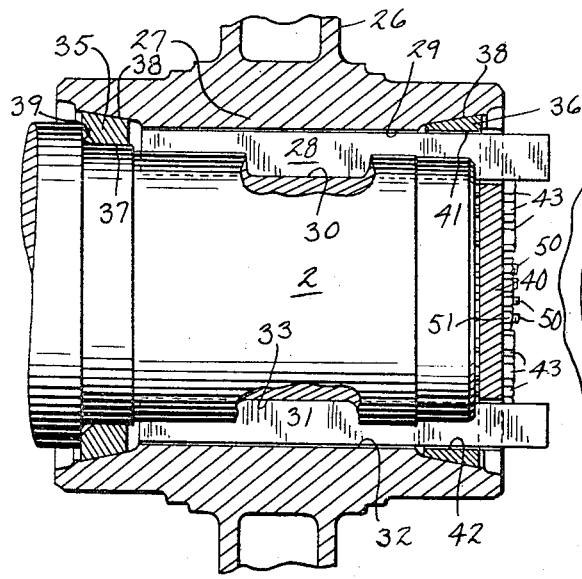
Figure 10:
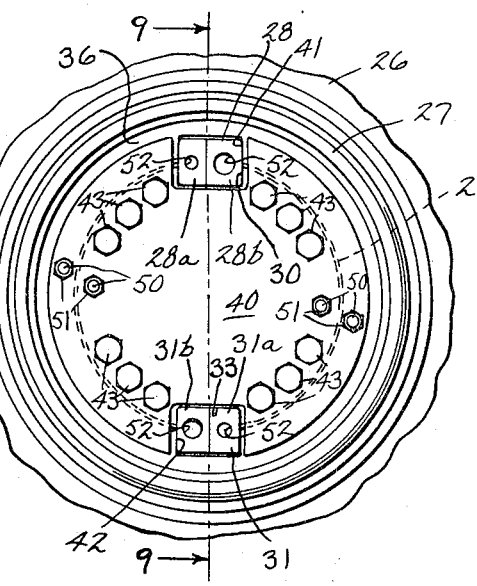
Figure 11:
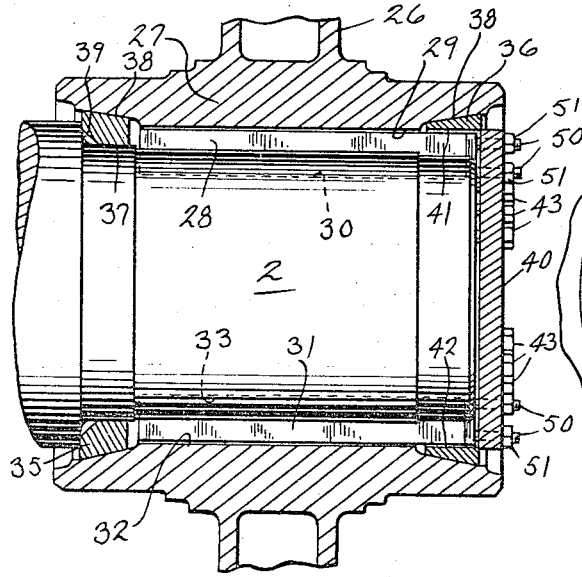
Figure 12:
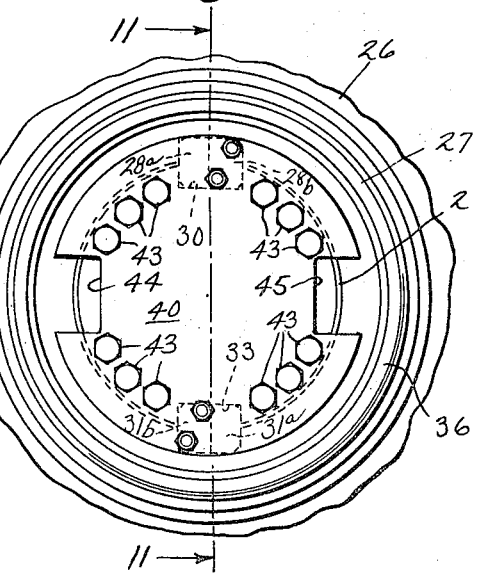

Turning to FIGS. 9 and 10, the key means 28 is inserted in the keyways 29 and 30. As best indicated in FIG. 10, the key means 28 comprises a pair of tapered keys 28a and 28b (i.e., with their mating surfaces tapered) which are inserted side-by-side in the two keyways through the slots 44 and 41 of the locking plate 40 and supporting ring 36 respectively. Tapered key 28a is first inserted until it engages the end of the keyways and then tapered key 28b is driven in place lightly to check its fit and alignment. The necessary contact patterns are taken, after which the keys are withdrawn and hand fit to obtain full bearing on the key and keyway contacting surfaces. Also as indicated in FIG. 9, the keys 28a and 28b are long enough so that when placed in their correct axial position in their keyways, there will be an end portion of each key projecting beyond the end of the locking plate 40, about a 2½″ projecting portion being satisfactory. When the keys 28a and 28b are properly fit, the bolts 43 are tightened uniformly until the hollow shaft member 27 is set tightly on both supporting rings 35 and 36. Key 28a is then reinserted into position to be tight against the end of the keyway 30, and key 28b positioned lightly in place. Next, the key means 31 is fit into the keyways 32 and 33 of the hollow shaft member 27 and trunnion shaft respectively. Again as shown in FIG. 10, the key means 31 comprises a pair of mating tapered keys 31a and 31b. Using a procedure similar to that for the keys 28a and 28b, the two keys 31a and 31b are hand fit in position until satisfactory contact patterns and full bearing is obtained, with any offset between keyway 32 and keyway 33 compensated for by machining the two keys. When this is done, key 31a is placed tightly in position against the end of the keyway 33 and key 31b is driven in place lightly. Thereafter, the keys 28b and 31b are measured for the length necessary to have their outermost ends flush with the ends of the trunnion shaft. The two keys are then removed with jack screws, each key having a tapped hole 52 at its outer end for this purpose cut to the measured length. The keys 28a and 31a are cut to a length slightly shorter than the other keys so that they will fit just inside the end of the trunnion shaft when the keys are assembled in their final condition.

After the four keys are cut to their proper length, they are reinstalled in their respective keyways and driven home with a suitable drift pin.

After the keys are in position, the bolts 43 are removed and the lock plate 40 taken off the end of the trunnion shaft 2. Thereafter, the locking plate 40 is rotated 90° from the position shown in the proceding drawings to the position illustrated in FIGS. 11 and 12 wherein its slots 44 and 45 are out of alignment with the ends of the keys 28a, 28b and 31a, 31b. Thereafter the bolts 43 are tightened to secure the drive in final position on trunnion shaft 2. In this position, the locking plate provides the means for retaining the keys in their keyways by set screws 50 which are threaded through the locking plate so as to contact the end of each key 28b and 31b. The set screws are then held in place with lock nuts 51 so as to further aid in retaining the keys in the final position.

The gear drive 6 is now fully assembled to its supporting shaft with the hollow shaft member 27 of the drive supported on the tapered supporting rings 35 and 36 in accordance with the objects of this invention.

There has thus been described structure for mounting a shaft mounted gear drive on a supporting shaft which is capable of satisfying the objects of this invention. In summary, a pair of spaced supporting rings are carried on the supporting shaft and each ring has a tapered or inclined peripheral surface on which the hollow shaft member of the gear drive is supported. A driving connection is established between the hollow shaft member and the supporting shaft. When the gear drive is mounted along the end of the supporting shaft, a locking plate is attached to the end of the shaft, and when key means are used as the driving connection between the drive and the shaft, the locking plate is slotted so that the keys can be inserted in their keyways through the plate. The outer or peripheral surface of the supporting rings which contact interior portions of the hollow shaft member of the gear drive are tapered to provide a tight diametrical fit between the rings and the shafts. With the use of the supporting rings of this invention, except for the portion of the hollow shaft member of the gear drive contacting the tapered outer surfaces of the rings, there is a clearance space between the hollow shaft and the supporting shaft on which the gear drive is mounted, i.e., the balance of the interior of the hollow shaft is spaced from the periphery of the supporting shaft. For purposes of preventing the fretting corrosion along the section indicated as B of the hollow shaft member 27 in FIG. 3 above, a clearance should be on the order of at least about .030 inch to .100 inch. The clearance within the stated range is suitable for many installations, although in some particular installations it would be possible to establish a greater clearance or even, in some instances, a somewhat lesser amount of clearance than the lower limit of such range. The mounting system according to the present invention permits facile assembly and disassembly of a shaft mounted gear drive unit on a supporting shaft and greatly reduces the fretting corrosion obtained with prior art mounting systems.

The following example illustrates some dimensions of the design of an installation according to this invention. A pair of spaced supporting rings each having a large diameter of about 26 inches and a small diameter of about 24½ inches and each being about 4 inches wide were used on a trunnion shaft about 24 inches in diameter. The hollow shaft member of the gear drive was about 27 inches long and the clearance between the hollow shaft member and the trunnion shaft, except for those portions of the hollow shaft in contact with the tapered outer surfaces of the supporting rings, was a nominal 0.050 inch.

Although a specific example of this invention has been herein illustrated and described, it is expected that those skilled in the art can make changes therein and still remain within the scope of this invention. For example, one or both of the supporting rings may be split at one section if such would be an aid in obtaining proper fit of the rings about the supporting shaft. While a shaft mounted gear drive has been illustrated in which all of its elements were carried on a housing which in turn was journaled on a hollow shaft member, some of the elements of the gear drive could also be supported on floors or foundations instead of all being on the housing. Thus, if desired, only the low speed pinion 23 and gear 26 could be supported on or in the housing, and the motors and speed reducers could be supported on foundation members separate from the housing and coupling connected to the low speed pinion. While the drive has been shown as being installed on the end of a supporting shaft which is cantilevered from a pedestal, it can also be placed on a shaft section between two supports.

It is to be understood that it is intended to cover all changes and modifications of the illustrative example of this invention which do not constitute a departure from the spirit and scope of this invention.

We claim:

1. In combination with (1) a shaft mounted gear drive unit including a hollow shaft member, a gear attached to the hollow shaft member, and speed reduction gearing driving said gear, and (2) a first shaft on which the gear drive unit is to be supported;

a pair of spaced supporting rings on the first shaft, each ring having an inner surface contacting the first shaft and a tapered peripheral surface contacting an interior portion of the hollow shaft member, each such interior portion of the hollow shaft member being tapered to mate with the tapered peripheral surface of its abutting supporting ring, and the balance of the hollow shaft member except for such portions being spaced from the periphery of the first shaft;

means establishing a driving connection between the hollow shaft member and the first shaft; and a locking plate attached to the first shaft and having a marginal portion extending beyond the periphery of the first shaft, said locking plate including an opening through which said means establishing a driving connection can be inserted into position with the locking plate attached to the first shaft.

2. Apparatus according to claim 1 wherein:

the means establishing a driving connection between the hollow shaft member and first shaft comprises at least one keyway defined along the inner surface of the hollow shaft member, a mating keyway in the first shaft for each keyway in the hollow shaft member, and key means inserted in said keyways.

3. Apparatus according to claim 2 wherein:
the hollow shaft member of the gear drive is positioned along an end of the first shaft, one of the supporting rings includes a slot in alignment with each keyway defined in the hollow shaft member and through which key means extend to be positioned in such keyways.

4. Apparatus according to claim 3 wherein:
the locking plate is attached to the end of the first shaft and includes a slot for each slot in said one supporting ring and through which the key means may pass; the locking plate having a first position in which its slots are aligned with the slots in the one supporting ring and a second position in which its slots are out of alignment with slots in the one supporting ring.

References Cited
UNITED STATES PATENTS

| | | | |
|---|---|---|---|
| 2,734,396 | 2/1956 | Falk et al. | 74—665 |
| 3,333,801 | 8/1967 | Falk | 74—665 |

ROBERT M. WALKER, *Primary Examiner.*

LEONARD H. GERIN, *Examiner.*